United States Patent
Ding et al.

(10) Patent No.: US 10,871,951 B2
(45) Date of Patent: Dec. 22, 2020

(54) CODE CORRECTION

(71) Applicant: Palantir Technologies, Palo Alto, CA (US)

(72) Inventors: James Ding, New York, NY (US); Alexander Rilee, Lanham, MD (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 16/366,318

(22) Filed: Mar. 27, 2019

(65) Prior Publication Data

US 2019/0303116 A1 Oct. 3, 2019

(30) Foreign Application Priority Data

Mar. 27, 2018 (GB) .................................. 1804904.9

(51) Int. Cl.
*G06F 9/44* (2018.01)
*G06F 9/445* (2018.01)
(Continued)

(52) U.S. Cl.
CPC ........ *G06F 8/4435* (2013.01); *G06F 3/04817* (2013.01); *G06F 3/04842* (2013.01); *G06F 8/33* (2013.01); *G06F 8/38* (2013.01); *G06F 11/3688* (2013.01); *G06F 8/70* (2013.01); *G06F 11/3636* (2013.01); *G06F 11/3664* (2013.01)

(58) Field of Classification Search
CPC . G06F 8/4435; G06F 8/33; G06F 8/38; G06F 3/04817; G06F 3/04842;
(Continued)

(56) References Cited

U.S. PATENT DOCUMENTS 9,589,232 B2 * 3/2017 Gould ....................... G06F 8/10
2014/0344625 A1 * 11/2014 Thatte ................. G06F 11/3636
714/38.1
(Continued)

OTHER PUBLICATIONS

Luis Pina, Tedsuto: A General Framework for Testing Dynamic Software Updates, 2016, pp. 278-287. https://ieeexplore.ieee.org/stamp/stamp.jsp?tp=&arnumber=7515479&isnumber=7515425 (Year: 2016).*

(Continued)

*Primary Examiner* — Mongbao Nguyen
(74) *Attorney, Agent, or Firm* — McAndrews, Held & Malloy, Ltd,

(57) ABSTRACT

A method, performed by processors, includes providing code representing a plurality of data processing elements of an executable data transformer, the data processing elements being configured to receive datasets and to produce transformed datasets. The method may include executing a sub-portion of the code up to an inserted breakpoint and displaying a result of the executed code sub-portion up to the breakpoint on datasets in an analysis window, receiving test code in a console window and executing the test code to apply a transformation on the data sets transformed by the code sub-portion up to the breakpoint to generate an updated result of a test transformation in the analysis window, and/or inserting the test code received in the console window to the code of the data transformer, responsive to user selection, the test code being inserted after the breakpoint.

12 Claims, 9 Drawing Sheets

(51) Int. Cl.
*G06F 8/41* (2018.01)
*G06F 3/0481* (2013.01)
*G06F 3/0484* (2013.01)
*G06F 8/38* (2018.01)
*G06F 8/33* (2018.01)
*G06F 11/36* (2006.01)
*G06F 8/70* (2018.01)

(58) Field of Classification Search
CPC ............. G06F 11/3688; G06F 11/3636; G06F 11/3664; G06F 8/70
See application file for complete search history.

(56) References Cited

U.S. PATENT DOCUMENTS

| | | | |
|---|---|---|---|
| 2016/0321159 A1* | 11/2016 | Romm | G06F 11/364 |
| 2017/0206155 A1* | 7/2017 | Ren | G06F 11/3684 |
| 2018/0024911 A1* | 1/2018 | Kruszewski | G06F 8/447 717/125 |
| 2018/0032320 A1* | 2/2018 | Aldea Lopez | G06F 8/34 |
| 2018/0129374 A1* | 5/2018 | Kim | G06T 11/206 |
| 2018/0143826 A1* | 5/2018 | Crabtree | G06F 11/3616 |
| 2019/0026082 A1* | 1/2019 | Shalev | G06F 3/0486 |
| 2019/0213101 A1* | 7/2019 | Raviv | G06F 8/33 |
| 2019/0213115 A1* | 7/2019 | Takawale | G06F 8/30 |
| 2019/0227911 A1* | 7/2019 | Raviv | G06F 3/0482 |
| 2019/0243613 A1* | 8/2019 | Pragya | G06F 8/33 |
| 2019/0243641 A1* | 8/2019 | Gass | G06F 3/04842 |
| 2019/0278694 A1* | 9/2019 | Tucker | G06F 11/3624 |

OTHER PUBLICATIONS

Iberia Medeiros, Detecting and Removing Web Application Vulnerabilities with Static Analysis and Data Mining, 2015, pp. 54-68. https://ieeexplore.ieee.org/stamp/stamp.jsp?tp=&arnumber=7206620&isnumber=7422884 (Year: 2015).*

* cited by examiner

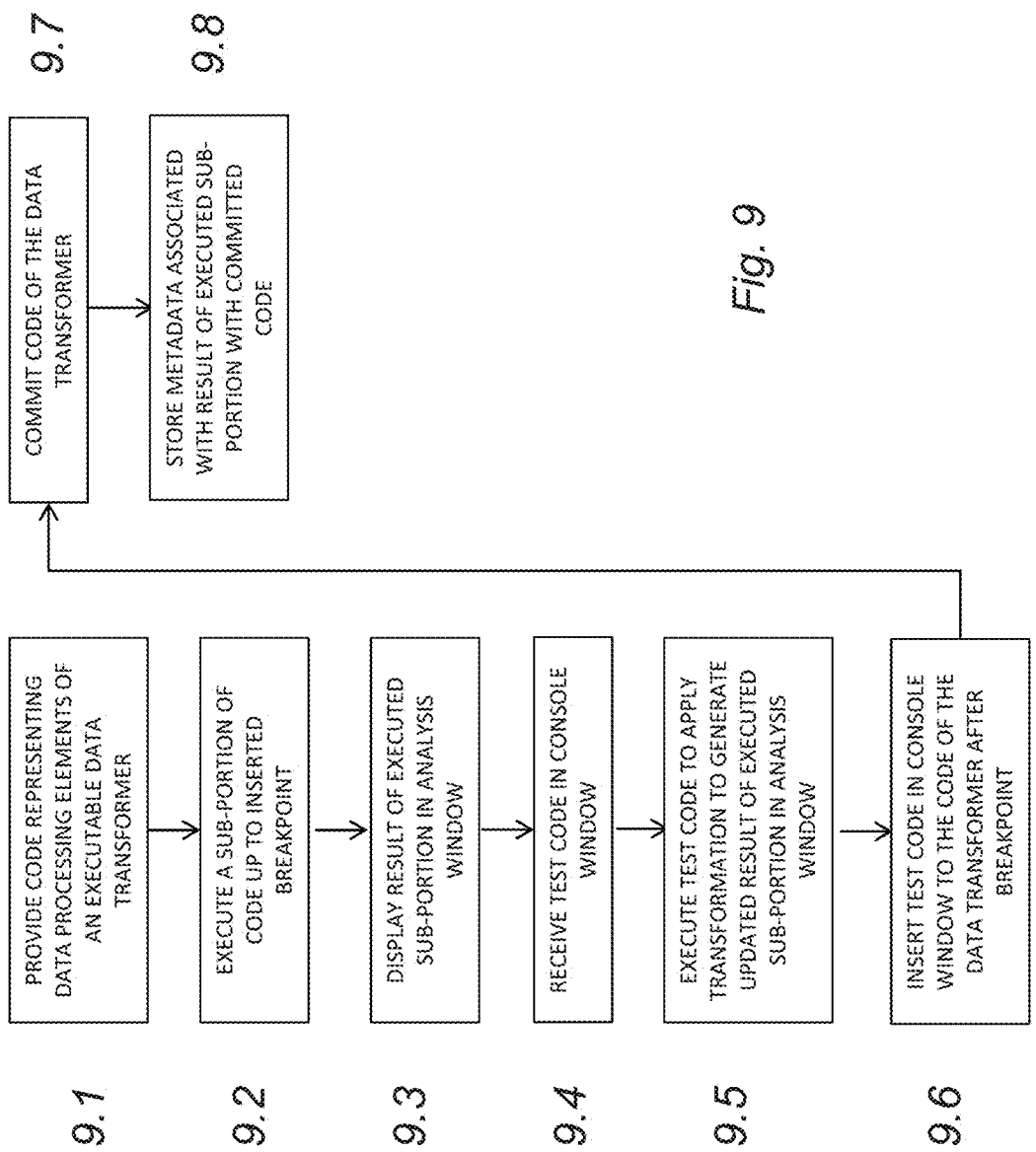

CODE CORRECTION

FIELD OF THE DISCLOSURE

The present disclosure relates to a method and systems for code correction, for example using a code correction tool for code representing one or more data transformers which for example may form part of a code production pipeline.

BACKGROUND

Cloud computing is computing infrastructure for enabling ubiquitous access to shared pools of servers, storage, computer networks, applications and other data resources, which can be rapidly provisioned, often over the Internet.

A data resource in this context is any form of executable software code or data structure, usually but not exclusively for providing a service (and hence may be referred to as a data or software service) for example a data analysis application, a data transformation application, a report generating application, a machine learning process, a spreadsheet or a database.

Where a data resource provides a data transformation, it generally means that it receives input data and performs some transformation on the input data to generate output data in a different, transformed form. Code which provides such a data transformation or multiple data transformations may be termed a data transformer. A data transformer, or a collection of such data transformers, may be part of a data processing pipeline in which at least one data transformer has a dependency on another data transformer or another data resource.

Code may produce erroneous or unexpected results. This may be due to bugs in the code or other issues, for example values in data sets to which the code refers. Where the code forms at least part of a production pipeline, such errors may propagate through the pipeline so it can be difficult to identify both where errors are occurring in the code and the necessary remedial action, without adversely affecting the overall pipeline. Analysis and remedial action of such code can be cumbersome and problematic.

SUMMARY

An embodiment provides a method, performed by one or more processors, the method comprising: providing code representing a plurality of data processing elements of an executable data transformer, one or more of the data processing elements being configured to receive one or more datasets and to produce one or more transformed datasets; executing a sub-portion of the code and displaying a result of the executed code sub-portion on one or more datasets in a first portion of a user interface; receiving test code in a second portion of the user interface and executing the test code to apply a transformation on the one or more data sets transformed by the code sub-portion to generate an updated result of a test transformation in the second portion; and inserting the test code received in the second portion to the code of the data transformer, responsive to user selection.

The sub-portion of the code may be executed up to an inserted breakpoint and wherein the test code may be inserted after the breakpoint.

The test code may be inserted responsive to user selection by means of a single click or tapping action.

The single click or tapping action may be received in relation to a dedicated insertion button or icon on the user interface.

The test code that is inserted responsive to user selection may comprise all test code in the second portion of the user interface.

The generated, updated result of the test transformation may comprise one or more of error messages, tabular data, graphical data, statistical output.

The method may further comprise automatically detecting, from one or more of the displayed result, or updated result, erroneous data.

Automatically detecting erroneous data may comprise identifying one or more outliers in statistical output.

The method may further comprise highlighting the automatically detected erroneous data in the first portion of the user interface.

The method may further comprise displaying in a third portion of the user interface the provided code representing the plurality of data processing elements of an executable data transformer, and receiving insertion of the breakpoint by means of placement of a breakpoint graphic adjacent a line of said code.

The third portion of the user interface may be configured to prevent user modification of said provided code other than by means of insertion of the test code.

The method may further comprise displaying a notification in the event that the breakpoint is moved without insertion of the test code.

The method may further comprise saving the updated result and associating metadata to the code of the data processing pipeline upon inserting the test code, which metadata references the saved updated result such that subsequent selection of the data processing pipeline or the metadata causes the saved result to be displayed. The result may be a visual result, such as tabular data, graphs etc. in any suitable format.

Another embodiment provides a computer program, optionally stored on a non-transitory computer readable medium program which, when executed by one or more processors of a data processing apparatus, causes the data processing apparatus to carry out a method comprising providing code representing a plurality of data processing elements of an executable data transformer, one or more of the data processing elements being configured to receive one or more datasets and to produce one or more transformed datasets; executing a sub-portion of the code up to an inserted breakpoint and displaying a result of the executed code sub-portion up to the breakpoint on one or more datasets in a first portion of a user interface; receiving test code in a second portion of the user interface and executing the test code to apply a transformation on the one or more data sets transformed by the code sub-portion up to the breakpoint to generate an updated result of a test transformation in the second portion; and inserting the test code received in the console window to the code of the data transformer, responsive to user selection, the test code being inserted after the breakpoint.

Another embodiment provides an apparatus configured to carry out a method according to any previous definition, the apparatus comprising one or more processors or special-purpose computing hardware.

BRIEF DESCRIPTION OF THE DRAWINGS

Example embodiments will now be described by way of non-limiting example with reference to the accompanying drawings, in which:

FIG. 9 is a flow diagram showing processing operations that may be performed by the code modifying tool, according to embodiments.

DETAILED DESCRIPTION OF CERTAIN EMBODIMENTS

Figure 1:
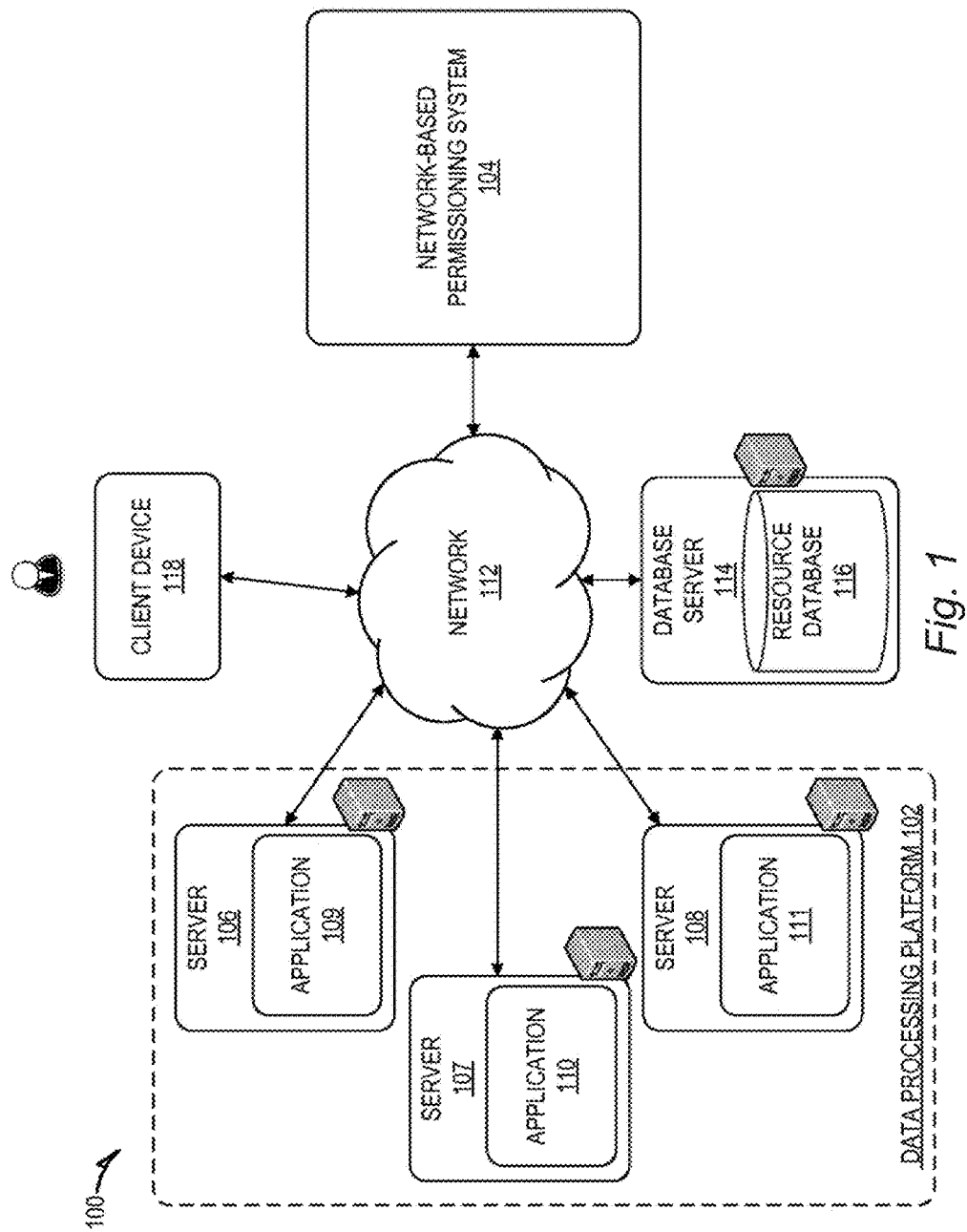
FIG. 1 is a block diagram illustrating a network system comprising a group of application servers of a data processing platform according to embodiments of this specification.

Embodiments herein relate to data transformers. Data transformers, in a broad sense, are one or more data processing elements which receive input data and perform some transformation on the input data to generate output data. A data transformer may comprise, for example, code representing one or more mathematical operations to perform on an identified data set, which may be retrieved from a database, or may be received from another data transformer or another type of processing element. Alternatively, a data transformer may comprise, for example, code representing a combination or joining of two or more data sets, or code representing one or more data analysis tasks on one or more data sets. A data transformer, or a collection of such data transformers, may be part of a data processing pipeline in which at least one data transformer has a dependency on another data transformer or another data resource.

Embodiments relate to methods and systems for providing code representing one or more data processing elements of an executable data transformer, one or more of the data processing elements being configured to receive one or more datasets and to produce one or more transformed data sets. Embodiments also relate to executing a sub-portion of the code up to an inserted breakpoint and displaying a result of the executed sub-code up to the breakpoint on the one or more datasets in a first display portion of a user interface.

Embodiments also relate to receiving test code in a second display portion of the user interface and executing the test code to apply a transformation on the one or more data sets transformed by the code sub-portion to generate an updated result of a test transformation in the second display portion. Embodiments also relate to inserting the test code received in the second display portion to the code of the data transformer, responsive to user selection. Where a breakpoint is used to define the sub-portion, the test code may be inserted after the breakpoint, e.g. directly after the breakpoint.

In some embodiments, individual lines or sets of test code may be selected and copied. For example, individual lines, for example corresponding to one or more commands, in the test code can be selected or highlighted and copied in any conventional way, e.g. using copy and paste, or through a button. This enables, through code inspection, which lines to insert into the code of the data transformer. In another example embodiment, through code inspection, selection of a "target" command for insertion into the code of the data transformer may automatically insert other commands which are dependencies of the target command. For example, if command #10 is selected, and commands #3, #4 and #7 led up to command #10, then commands #3, #4 and #7 may also be inserted into the code of the data transformer in the appropriate order.

The first and second display portions may be provided as part of a code analysis and updating tool (hereafter "code updating tool" or "code correcting tool"). The code updating tool may also provide another display portion which displays at least some of the executable code to which analysis and updating is applied.

In some embodiments, the test code is inserted responsive to user selection by means of a single action, e.g. a single click button, associated with the console window. The test code may comprise all test code in the second display portion, ensuring that all remedial code is copied over to the executable code at the correct place in the executable code.

In some embodiments, the updated result is saved and metadata referencing the saved updated result is added to the code of the data processing pipeline such that subsequent selection of the metadata may cause the saved updated analysis result to be displayed.

Embodiments therefore generally relate to interactive editing of executable code providing one or more data transforms. The executable code may be "live" in the sense that it is running or executing on a user's computer platform, or possibly on a cloud computing platform remote from the user but which is associated with the user. The live code may be, for example, producing output or controlling a technical system or industrial process. To enable identification of erroneous code, that is one or more of code which comprises bugs, code which produces erroneous data and code which produce unexpected data, embodiments enable the insertion of breakpoints in relation to the executable code. This may be by means of a graphical user interface (GUI) in which the executable code is presented in a live code window. A cursor, pointer or touch-screen interface may be used to select a line within the executable code at which the breakpoint is inserted. A breakpoint is an intentional stopping or pausing place in a program, typically put in place for debugging purposes. It enables knowledge about how a program is performing to be obtained during its execution up to the breakpoint.

Embodiments generally cause the result of executing the sub-portion of the executable code, up to the breakpoint, to be displayed in an analysis window, which may be a separate window displayed simultaneously with the live code window, possibly within the same software tool. A user, such as a developer, may therefore see a visual result of executing the sub-portion up to the breakpoint, which may use any suitable format. For example, the visual result may comprise one or more error messages, output data in list, tabular or graphical form, or a combination thereof.

Embodiments generally provide a further console window, which may be a text-only window for receiving test code separate from the executable code. The console window may operate at the command line level. The console window may be displayed simultaneously with the executable code which is provided in the live code window. The console window may also be displayed simultaneously with the analysis window, possibly within the same software tool. Test code received into the console window may reference the same data sets and/or data resources as the executable code in the live code window such that modifications (whether removing, adding or replacing code portions) to the executable code can be tested without affecting the execution of the executable code. Therefore, live executable code will not be affected or accidentally changed by test code at this point.

Embodiments enable visualization of the result of the test code in the analysis window. For example, the result may be a graphical visualization in any manner described above. For example, the graphical visualization may be a statistical analysis from which outliers or the presence of overfitting may be immediately evident or otherwise flagged. If the result indicates erroneous code, test code can be written, the result viewed and if necessary, new test code entered within the console window or the current test code modified and a new visualized result analyzed.

Embodiments may further enable the test code entered in the console window, i.e. the test code in its current form, to be inserted into the executable code at or after the current breakpoint in response to user action. This may be performed by a single user action, for example selecting or clicking an insert button in a single action, or a single touch on a touch screen interface. Advantageously, this means that the test code may be inserted at the correct place in the executable code in order to produce the remedial action as previously visualized and verified. It avoids the need for a user to perform, for example, manual copying and pasting of the test code from the console into the executable code window, where mistakes can easily be made. For example, the user may not select and copy all of the test code, which may occur if the test code extends outside (e.g. below) the displayable console window which is of limited size. Furthermore, automatic placement after the breakpoint avoids incorrect placement of the test code into the executable code at a point which may cause new errors in the executable code. Furthermore, insertion may be performed at a determined time during execution of live code that will not affect its operation.

Embodiments therefore provide a code updating tool in which users, e.g. developers, may analyses executable code to identify issues, through analysis, provide test code in a separate but related console to ascertain the effect of the test code up to the breakpoint, and then to insert the test code into the live code by means of a simple interaction to perform remedial action with improved speed, accuracy and reducing the chances of negatively affecting the executable code, which may be live. The code updating tool may for example be used by developers in relation to third party software and systems, and therefore the updating of such third party code should be handled carefully.

In the context of the following, the following definitions apply.

A data processing platform is any computing platform on which executable code, or software, may be executed, providing particular functionality and restrictions, in that low-level functionality is provided which the executable code needs to conform to.

A data resource is any form of executable software, data set, or data structure usually, but not exclusively for providing a service, for example a data analysis application, a data transformation application, a report generating application, a machine learning process, a spreadsheet or a database. A data resource may be created, viewed and/or edited or executed via a data processing pipeline management tool, which embodiments to be described later on relate to.

A data repository is any form of data storage entity into which data is specifically partitioned or isolated.

An execution environment is any representation of an execution platform, such as an operating system or a database management system.

A dataset, sometimes used interchangeably with data; a dataset holds data on the data processing platform, and usually has an accompanying schema for the dataset in order to make sense, or interpret, the data within the dataset.

The data processing platform may be an enterprise software platform associated with an enterprise platform provider. An enterprise software platform enables use by multiple users, internal and external to the enterprise platform provider. The users may be users of different respective organizations, such as different commercial companies.

The data resources stored on the software platform, which may comprise data transformers forming part of a product pipeline, may relate to technical data and/or technical processes.

For example, in a financial organization, it may be required to identify a list of suspicious customers by processing raw accounts, transactions and customer data in a particular order in order first to provide clean versions of the raw datasets (removing unwanted or unnecessary fields of the datasets to make data processing more efficient) and then to identify suspicious transactions which may for example be above a certain monetary amount. By correlating customer data with the suspicious transactions data, suspicious customers may be identified. This is given by way of a simple example, and will be explained further in relation to one of the embodiments below.

For example, an engine manufacturer may create and store a database relating to spare parts for the different models of engines it produces and services. The database may, for example, be a multi-dimensional relational database. Certain analyses may be performed on the database using another application, for example an executable application resource for analyzing and/or transforming the data in order to identify trends which may be useful for predicting when certain parts will fail and/or need.

For this purpose, the software platform may comprise enterprise applications for machine-analysis of data resources. For example, an organization may store on the software platform history data for a machine and use an enterprise application for the processing of history data for the machine in order to determine the probability, or a risk score, of the machine, or a component sub-system of the machine, experiencing a fault during a future interval. The enterprise application may use the fault probabilities or risk scores determined for a machine to select a preventative maintenance task which can reduce the probability and/or severity of the machine experiencing a fault. History data for a machine may include sensor logs, a sensor log being multiple measurements of physical parameters captured by a sensor and relating to different points in time (a time series). History data for a machine may also include computer readable logs such as maintenance logs, fault logs and message logs corresponding to a machine. The maintenance log corresponding to the machine may record information such as dates and locations of prior maintenance tasks, details of replacement parts, free text notes made by an engineer or mechanic performing a maintenance task and so forth. The fault log corresponding to the machine may record information such as dates and locations of faults, the types of faults, the period of time required to rectify each fault and so forth. The message log corresponding to a machine, such as a ship or construction machinery, may records messages generated by controllers, processors or similar devices which are integrated into the component sub-systems of the machine. The messages may include a date and time, an identifier of a component sub-system, and message content such as, for example, warning information of information identifying a fault.

A production pipeline is a set of data elements connected in series, where the output of a first element is the input of a second element. One or more other data elements may be connected to the input of the first or second elements. Some data elements may be performed in parallel, at least partially. Some data elements may perform a task or a part of a larger task when combined with others.

Certain data elements may be data sets, which may be raw data or processed data. In this case, the data sets may be represented in any suitable form, for example as database tables comprising one or more rows and columns. The data sets may represent technical data, e.g. data representing sensed or measured data from physical sensors in an industrial setting or of a machine such as vehicle or craft. The data sets may represent inventory data. The data sets may represent pixels of an image. The data sets may represent financial data. Many other examples of what the data sets represent are envisaged.

Certain data elements may relate to tasks, or part of a larger task, which define a relationship between at least a first data element and a second data element, for example between one or more input data elements and one or more output data elements. The tasks may be performed using data processing elements, to be mentioned below, and may involve transforming the data in some way to achieve the defined relationship.

A production pipeline is fundamentally used to structure workflows done on complex tasks that may have dependencies, e.g. the data from an industrial sensor may be required before a further task is performed, although this may not be essential.

Data processing elements for performing tasks, or part of a larger task, may perform a relatively simple operation, such as removing certain types of data from a received data element, e.g. a particular column and/or row from a received table, combining two or more received tables or certain rows and/or columns thereof, performing a unit conversion operation on data to produce other data in the same units, shifting data and so on. Data processing elements may also perform more complex tasks by receiving or being applying user inputted code, such as Java, Python, or structured query language (SQL), for example to run a program of computer-readable instructions for transforming the one or more received data elements into a different form or to produce the result of a combination or calculation. Data processing elements may be executed in series, in parallel or in time-sliced fashion possibly with buffer storage between elements.

Particular embodiments will now be described with reference to the Figures.

FIG. 1 is a network diagram depicting a network system 100 comprising a data processing platform 102 in communication with a network-based permissioning system 104 (hereafter "permissioning system") configured for registering and evaluating access permissions for data resources to which a group of application servers 106-108 share common access, according to an example embodiment. Consistent with some embodiments, the network system 100 may employ a client-server architecture, though the present subject matter is, of course, not limited to such an architecture, and could equally well find application in an event-driven, distributed, or peer-to-peer architecture system, for example. Moreover, it shall be appreciated that although the various functional components of the network system 100 are discussed in the singular sense, multiple instances of one or more of the various functional components may be employed.

The data processing platform 102 includes a group of application servers, specifically, servers 106-108, which host network applications 109-111, respectively. The network applications 109-111 hosted by the data processing platform 102 may collectively compose an application suite that provides users of the network system 100 with a set of related, although independent, functionalities that are accessible by a common interface. For example, the network applications 109-111 may compose a suite of software application tools that can be used to analyses data to develop various insights about the data, and visualize various metrics associated with the data. To further this example, the network application 109 may be used to analyses data to develop particular metrics with respect to information included therein, while the network application 110 may be used to render graphical representations of such metrics. It shall be appreciated that although FIG. 1 illustrates the data processing platform 102 as including a particular number of servers, the subject matter disclosed herein is not limited to any particular number of servers and in other embodiments, fewer or additional servers and applications may be included.

The applications 109-111 may be associated with a first organization. One or more other applications (not shown) may be associated with a second, different organization. These other applications may be provided on one or more of the application servers 106, 107, 108 which need not be specific to a particular organization. Where two or more applications are provided on a common server 106-108 (or host), they may be containerized which as mentioned above enables them to share common functions.

Each of the servers 106-108 may be in communication with the network-based permissioning system 104 over a network 112 (e.g. the Internet or an intranet). Each of the servers 106-108 are further shown to be in communication with a database server 114 that facilitates access to a resource database 116 over the network 112, though in other embodiments, the servers 106-108 may access the resource database 116 directly, without the need for a separate database server 114. The resource database 116 may store other data resources that may be used by any one of the applications 109-111 hosted by the data processing platform 102.

In other embodiments, one or more of the database server 114 and the network-based permissioning system 104 may be local to the data processing platform 102; that is, they may be stored in the same location or even on the same server or host as the network applications 109, 110, 111.

As shown, the network system 100 also includes a client device 118 in communication with the data processing platform 102 and the network-based permissioning system 104 over the network 112. The client device 118 communicates and exchanges data with the data processing platform 102.

The client device 118 may be any of a variety of types of devices that include at least a display, a processor, and communication capabilities that provide access to the network 112 (e.g., a smart phone, a tablet computer, a personal digital assistant (PDA), a personal navigation device (PND), a handheld computer, a desktop computer, a laptop or netbook, or a wearable computing device), and may be operated by a user (e.g., a person) to exchange data with other components of the network system 100 that pertains to various functions and aspects associated with the network system 100 and its users. The data exchanged between the client device 118 and the data processing platform 102 involve user-selected functions available through one or more user interfaces (UIs). The UIs may be specifically associated with a web client (e.g., a browser) or an application 109-111 executing on the client device 118 that is in communication with the data processing platform 102. For example, the network-based permissioning system 104 provides user interfaces to a user of the client device 118 (e.g., by communicating a set of computer-readable instructions to the client device 118 that cause the client device 118 to display the user interfaces) that allow the user to register policies associated with data resources stored in the resource database 116.

Figure 2:
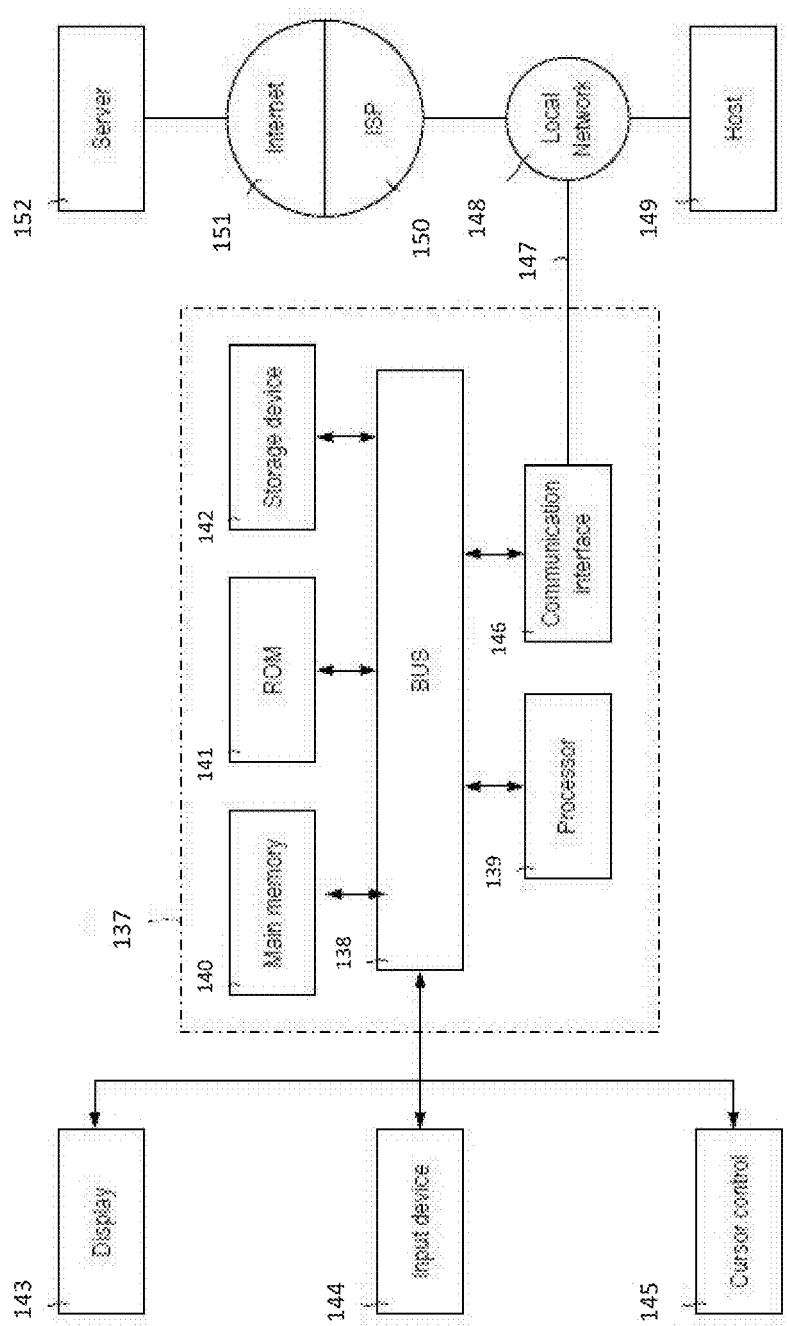
FIG. 2 is a block diagram of a computer system according to embodiments of this specification.

Referring to FIG. 2, a block diagram of an exemplary computer system 137, which may comprise the data processing platform 102, one or more of the servers 106-108, the database server 114 and/or the network-based permissioning system 104, consistent with examples of the present specification is shown.

Computer system 137 includes a bus 138 or other communication mechanism for communicating information, and a hardware processor 139 coupled with bus 138 for processing information. Hardware processor 139 can be, for example, a general purpose microprocessor. Hardware processor 139 comprises electrical circuitry.

Computer system 137 includes a main memory 140, such as a random access memory (RAM) or other dynamic storage device, which is coupled to the bus 138 for storing information and instructions to be executed by processor 139. The main memory 140 can also be used for storing temporary variables or other intermediate information during execution of instructions by the processor 139. Such instructions, when stored in non-transitory storage media accessible to the processor 139, render the computer system 137 into a special-purpose machine that is customized to perform the operations specified in the instructions.

Computer system 137 further includes a read only memory (ROM) 141 or other static storage device coupled to the bus 138 for storing static information and instructions for the processor) 139. A storage device 142, such as a magnetic disk or optical disk, is provided and coupled to the bus 138 for storing information and instructions.

Computer system 137 can be coupled via the bus 138 to a display 143, such as a cathode ray tube (CRT), liquid crystal display, or touch screen, for displaying information to a user. An input device 144, including alphanumeric and other keys, is coupled to the bus 138 for communicating information and command selections to the processor 139. Another type of user input device is cursor control 145, for example using a mouse, a trackball, or cursor direction keys for communicating direction information and command selections to the processor 139 and for controlling cursor movement on the display 143. The input device typically has two degrees of freedom in two axes, a first axis (for example, x) and a second axis (for example, y), that allows the device to specify positions in a plane.

Computer system 137 can implement the techniques described herein using customized hard-wired logic, one or more ASICs or FPGAs, firmware and/or program logic which in combination with the computer system causes or programs computer system 137 to be a special-purpose machine. According to some embodiments, the operations, functionalities, and techniques disclosed herein are performed by computer system 137 in response to the processor 139 executing one or more sequences of one or more instructions contained in the main memory 140. Such instructions can be read into the main memory 140 from another storage medium, such as storage device 142. Execution of the sequences of instructions contained in main memory 140 causes the processor 139 to perform the process steps described herein. In alternative embodiments, hard-wired circuitry can be used in place of or in combination with software instructions.

The term "storage media" as used herein refers to any non-transitory media that stores data and/or instructions that cause a machine to operate in a specific fashion. Such storage media can comprise non-volatile media and/or volatile media. Non-volatile media includes, for example, optical or magnetic disks, such as storage device 142. Volatile media includes dynamic memory, such as main memory 140. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but can be used in conjunction with, transmission media. Transmission media participates in transferring information between storage media. For example, transmission media includes coaxial cables, copper wire and fiber optics, including the wires that comprise bus 138. Transmission media can also take the form of acoustic or light waves, such as those generated during radio-wave and infra-red data communications.

Various forms of media can be involved in carrying one or more sequences of one or more instructions to processor 139 for execution. For example, the instructions can initially be carried on a magnetic disk or solid state drive of a remote computer. The remote computer can load the instructions into its dynamic memory and send the instructions over a telephone line or other transmission medium using a modem. A modem local to computer system 137 can receive the data on the telephone line or other transmission medium and use an infra-red transmitter to convert the data to an infra-red signal. An infra-red detector can receive the data carried in the infra-red signal and appropriate circuitry can place the data on bus 138. Bus 138 carries the data to the main memory 140, from which the processor 139 retrieves and executes the instructions. The instructions received by the main memory 140 can optionally be stored on the storage device 142 either before or after execution by the processor 139.

Computer system 137 also includes a communication interface 146 coupled to the bus 138. The communication interface 146 provides a two-way data communication coupling to a network link 147 that is connected to a local network 148. For example, the communication interface 146 can be an integrated services digital network (ISDN) card, cable modem, satellite modem, or a modem to provide a data communication connection to a corresponding type of telephone line. As another example, the communication interface 146 can be a local area network (LAN) card to provide a data communication connection to a compatible LAN. Wireless links can also be implemented. In any such implementation, the communication interface 146 sends and receives electrical, electromagnetic or optical signals that carry digital data streams representing various types of information.

The network link 147 typically provides data communication through one or more networks to other data devices. For example, the network link 147 can provide a connection through the local network 148 to a host computer 149 or to data equipment operated by an Internet Service Provider (ISP) 150. The ISP 150 in turn provides data communication services through the world wide packet data communication network now commonly referred to as the "Internet" 151. The internet 151 can be linked to one or more servers 152 connected to other ISPs, computers, databases, etc. The local network 148 and internet 151 both use electrical, electromagnetic or optical signals that carry digital data streams. The signals through the various networks and the signals on the network link 147 and through the communication interface 146, which carry the digital data to and from the computer system 137, are example forms of transmission media.

The computer system 137 can send messages and receive data, including program code, through the network(s), network link 147 and communication interface 146. For example, a first application server 106 may transmit data through the local network 148 to a different application server 107, 108.

The data processing platform 102 may be a containerized data processing platform. In this regard, a containerized data platform comprises "containers" which hold one or more applications, and associated data libraries, that are guaranteed to be co-located on the same host machine and which can share resources. Such software platforms may also provide a set of primitives which collectively provide mechanisms for deploying, maintaining and scaling applications. A basic scheduling unit may be called a pod. A pod may consist of one or more containers.

Figure 3:
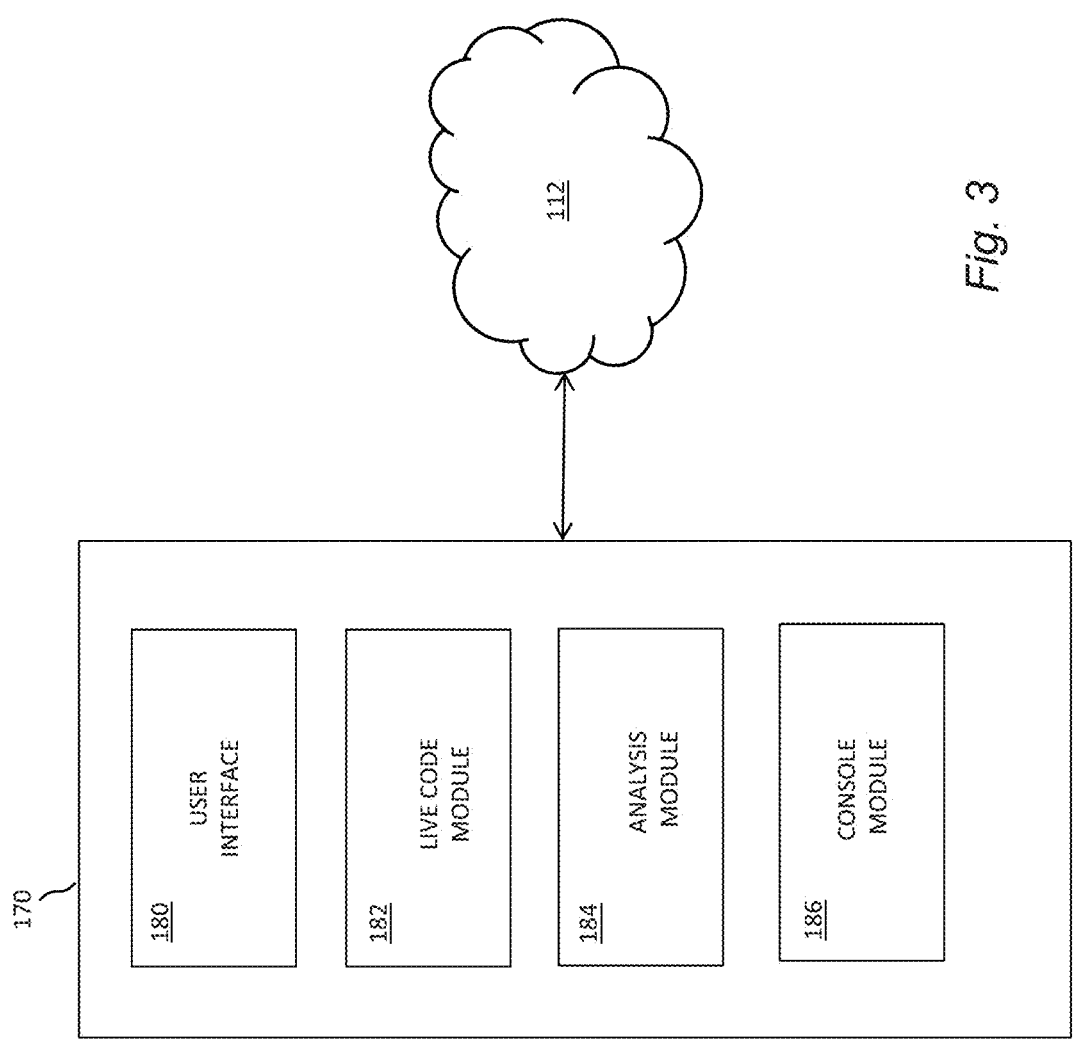
FIG. 3 is a schematic diagram of a code modifying tool according to embodiments.

In accordance with an example embodiment shown in FIG. 3, one or more of the application servers 106, 107, 108 in the data processing platform 102 shown in FIG. 1 may comprises a code updating tool 170, alternatively a code correction tool or code modifying tool, which may be operated by one or more users and provide a user interface 180 through which one or more display portions, e.g. windows, associated with modules of the code updating tool 170 are provided for display. One or more of said windows may be interactive, in the sense that, as well as providing displayable output, a user may enter data or make one or more selections or enter one or more commands in relation to the one or more windows.

For example, a live code module 182 may be provided for the entering, editing and/or viewing of executable code representing one or more data resources which may provide one or more transforming modules of a production pipeline. Where a data resource provides a data transformation, it generally means that it receives input data and performs some transformation on the input data to generate output data in a different, transformed form. Code which provides such data transformation or multiple data transformations may be termed a data transformer. A data transformer, or a collection of such data transformers, may be part of a data processing pipeline, i.e. production pipeline, in which at least one data transformer has a dependency on another data transformer or another data resource.

Typically, the live code module 182 may contain multiple lines of executable code, and comprise plural data transformers. The executable code may be in any suitable software language, typically a high-level language, and Python is given here as an example. The executable code may reference one or more data sets which may be stored elsewhere, for example in the resource database 116 of the database server 114 shown in FIG. 1.

The live code module 182 may contain executable code which is live, in the sense that it is running or is ready to run on one or more of the application severs 106, 107, 108.

The live code module 182 may also be configured to receive, through user interaction, a breakpoint for halting the execution of a sub-portion of the executable code up to the breakpoint.

Another module that may be provided as part of the code updating tool 170 is an analysis module 184. The analysis module 184 presents, in a portion or window of the user interface 180, the result of executing the executable code up to the breakpoint. The analysis module may present the resulting data in any suitable form, for example as error messages, statistical data, classification data, which may be in tabular, list or graphical form or any combination thereof. For example, one or more graphs representing the output of a statistical analysis on data points generated by the executable code may be presented by the analysis module 184.

Another module that may be provided as part of the code updating tool 170 is a console module 186. The console module 186 may be a text-only module for receiving test code. The console module 186 may operate at the command line. The test code may reference the executable code of the live code module 182 in any suitable way, or any such data set, in any suitable way, in order to apply modifications to the executable code in an environment that will not affect the operation of the live code module 182 and the executable code therein. The console module 186 may also present resulting data in the analysis module 184 in any suitable form, in order that the effect of applying the test data to the executable code is displayed.

The user interface 180 may be such that the live code module 182, the analysis module 184 and the console module 186 provide respective windows which are separate and displayed simultaneously as part of the code updating tool 170 for ease of use.

Figure 4:
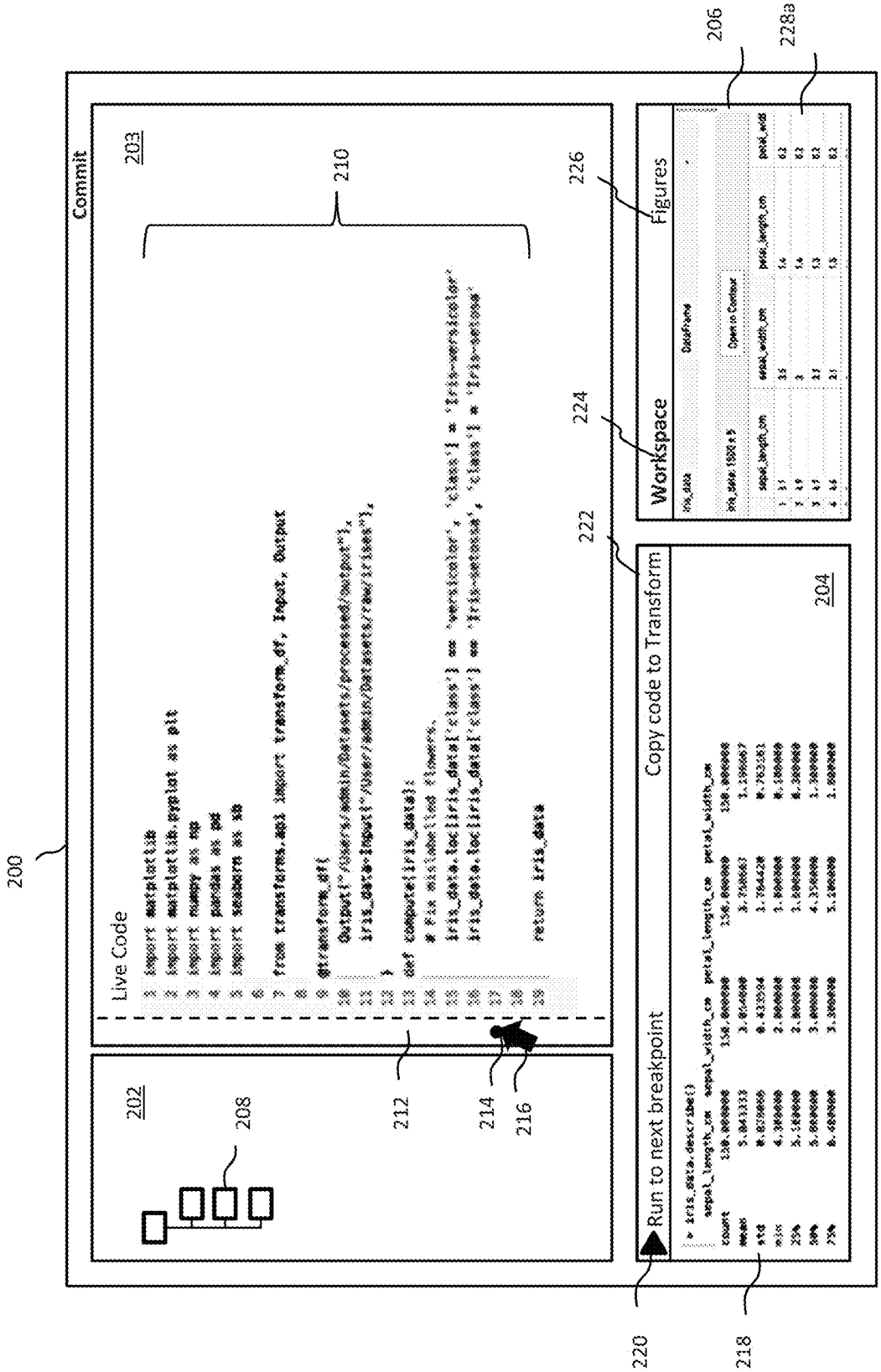
FIG. 4 is an example screenshot of the code modifying tool graphical user interface, according to embodiments.

FIG. 4 shows an example GUI 200 that may be displayed by the user interface 180 of the code updating tool 170.

The GUI 200 comprises a plurality of windows, comprising a file explorer window 202, a live code window 203, a console window 204 and an analysis window 206. The windows 202, 203, 204, 206 may be of any shape, layout or arrangement. The file explorer window 202 provides in visual form an interactive hierarchy of files that the user is able to access, by any conventional selection means, e.g. through a mouse pointer or keyboard or touch screen interface. The files may refer to any file type, but in embodiments herein we assume that the files refer to files containing executable code. A first file 208 may be selected from the file explorer window 202 to cause executable code 210 contained within the first file 208 to be opened within the live code window 203.

The live code window 203, associated with the live code module 182, displays the executable code 210 in any suitable manner. It will be appreciated that, due to the size limitations of computer displays and the shown GUI 200, only part of the executable code 210 may be shown at a given time. A scroll bar (not shown) may permit a user to scroll the displayed code upwards or downwards, and/or left and right, in order to navigate the executable code in the conventional way. The live code window 203 may allow user editing by means of receiving text or symbols entered through an input device such as a keyboard, which may be an external hardware peripheral or an on-screen keyboard. In other embodiments, the live code window 203 may prevent such manual editing to prevent accidental modification of the code in said live code window. In some embodiments, the executable code 210 may be live, in the sense that the code is committed in association with a particular third party user or organization and is presumed to be performing some task, or is ready to perform some task. As such, a developer who may not be the user, or part of the user's organization, may be restricted from modifying the executable code 210 unless their privileges allow, or they are specifically authorized by the particular user or organization, e.g. to perform remedial tasks.

A sidebar 212 is provided adjacent to the lines of code. The sidebar 212 is provided as part of the live code window 203 to permit the insertion of a breakpoint 214. As shown in FIG. 4, a breakpoint 214 is inserted at line 17 of the executable code by way of example. The breakpoint 214 may be inserted at any selected line, for example by using a movable pointer 216 to navigate to a selected line and initiating selection, e.g. using a mouse button or switch, or tapping a touch screen interface in a predetermined way. As will be appreciated, and as explained previously, the breakpoint 214 indicates a point in the executable code 210 where execution is halted or paused, thereby defining a sub-portion of the executable code prior to the breakpoint.

The console window 204, associated with the console module 186, is for receiving test code 218 which may be applied to the executable code 210 in the live code window 203 or to any data set referenced therein. The console window 204 may be a command line type window. Associated with the console window 204 are provided two user-selectable buttons, particularly a "run to next breakpoint" button 220 and a "copy code to transform" button 222. Said two user-selectable buttons 220, 222 may be provided elsewhere in the GUI 200, however.

User selection of the "run to next breakpoint" button 220 is effective to execute the executable code in the live code window 203 up to said breakpoint 214. This will produce some output, which is dependent on the purpose of the one or more data transformers. For example, the output may be any of one or more error messages, one or more alphanumerical results, one or more tables of results or one or more statistical results. In whichever form produced, these are termed "results" or "result data". The results are displayed automatically in the analysis window 206.

The analysis window 206, associated with the analysis module 184, may present the results in any suitable form. In the shown example, two tabs 224 and 226 are provided, enabling selection of either a workspace or figures view. A workspace view 224 comprises a list or table of results, which may include error messages, whereas a figures view 226 comprises one or more graphical versions of the results, e.g. one or more graphs, histograms, statistical distributions etc. It will be appreciated that in some circumstances, graphical versions provide a more meaningful understanding of results, particularly in relation to classification operations and those providing statistical results.

In the shown example, the example set of executable code 210 in the live code window 203 generally performs the function of classifying car faults into either Engine or Brake faults based on the speed of the car and the width of its brake pads when the fault occurred.

In the console window 204, test code written by the user to count the total number of faults is shown. In the analysis window 206, a set of results data 228a is shown in tabular form.

Figure 5:
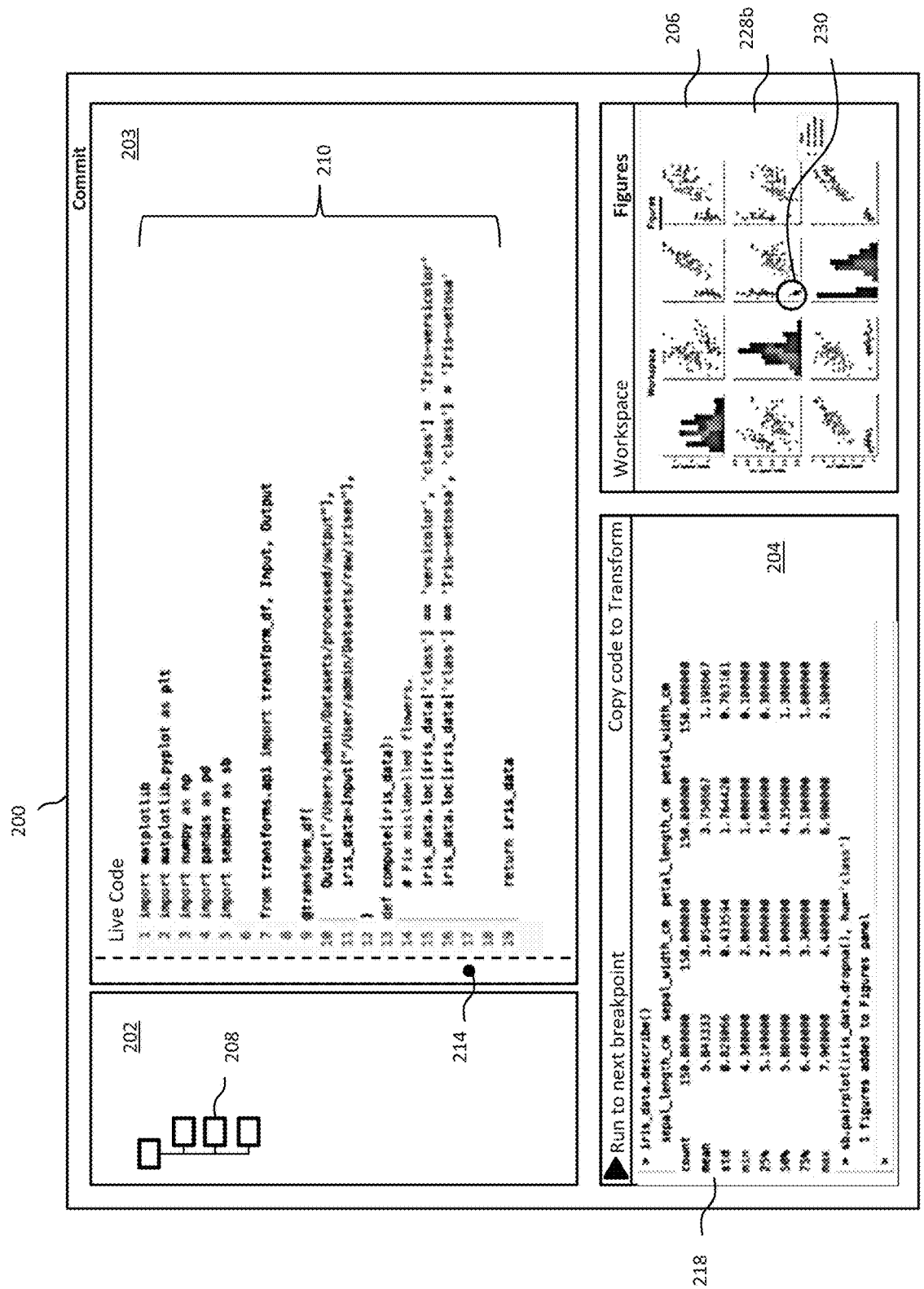
FIG. 5 is another example screenshot of the code modifying tool graphical user interface, according to embodiments.

Referring now to FIG. 5, the same GUI 200 is shown responsive to user selection of the Figures tab 226 in which the tabular results data are shown as a set of graphs 228b. In this case, it is possible to identify erroneous data from at least one of the graphs 228b, which may represent an error in the code and/or of an outlier in a data set referenced by the code. For example, an outlier 230 is shown circled which may affect subsequent results. However, said analysis window might alternatively or additionally return an error message. The analysis window 206, or another software module of the tool, may be configured to automatically detect errors, such as outliers, through such visual or tabular data and automatically notify this to the user. These detected outliers may relate to incorrectly classified data, e.g. a brake fault classified as an engine fault. For example, the tool may be configured to locate one or more data points above a predetermined variance from the majority of the data to identify one or more outliers.

Responsive to identifying an error, incorrect or unexpected result from the analysis window 206, remedial action may be taken by entering test code 218 within the console window 204. The console window 204 may be the only window in which the user is permitted to enter code.

Figure 6:
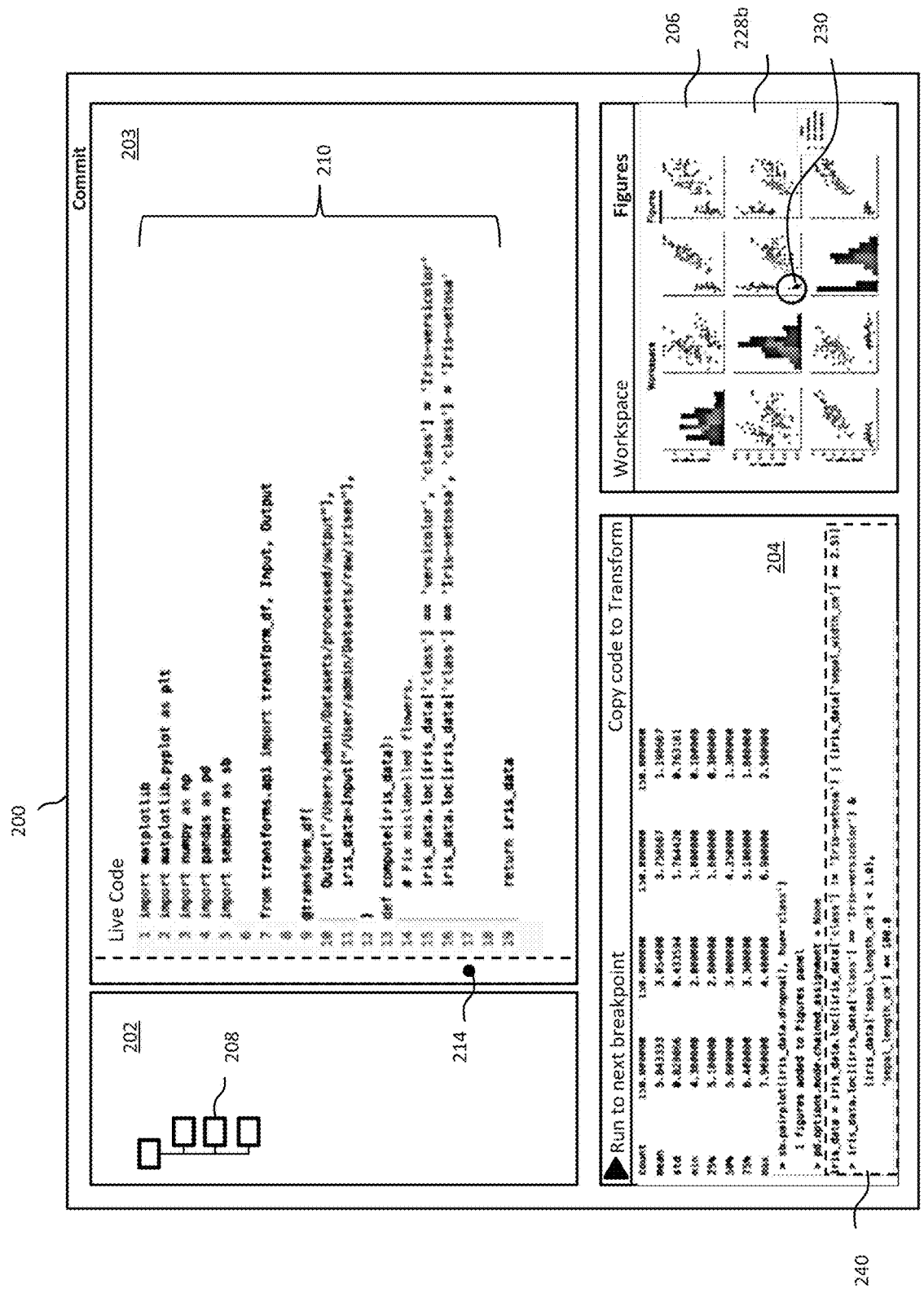
FIG. 6 is another example screenshot of the code modifying tool graphical user interface, according to embodiments.

Referring now to FIG. 6, the same GUI 200 is shown in which user-entered test code 240 has been entered in the console window 204. The test code 240 may reference the executable code in the live code window 203 but does not affect its operation because it is executed in isolation from the live code window 203. The purpose of the test code 240 in this example is to remove the erroneous data 230 identified in the analysis window 206. This may be done iteratively, for example by entering a first set of one or more lines of test code, executing to view the results in the analysis window 206, and then repeating one or more times if needed, until a desired result is achieved. The shown test code reclassifies any detected car faults where the brake pad width was less than 3 mm to Brake ('B') faults regardless of the classification previously set. Again, errors or outliers may be automatically detected and highlighted in any suitable form. Within the console window 204, the test code 240 may be executed in relation to the executable code up to the breakpoint 214 in order to produce an updated result which is displayed in the analysis window 206.

Figure 7:
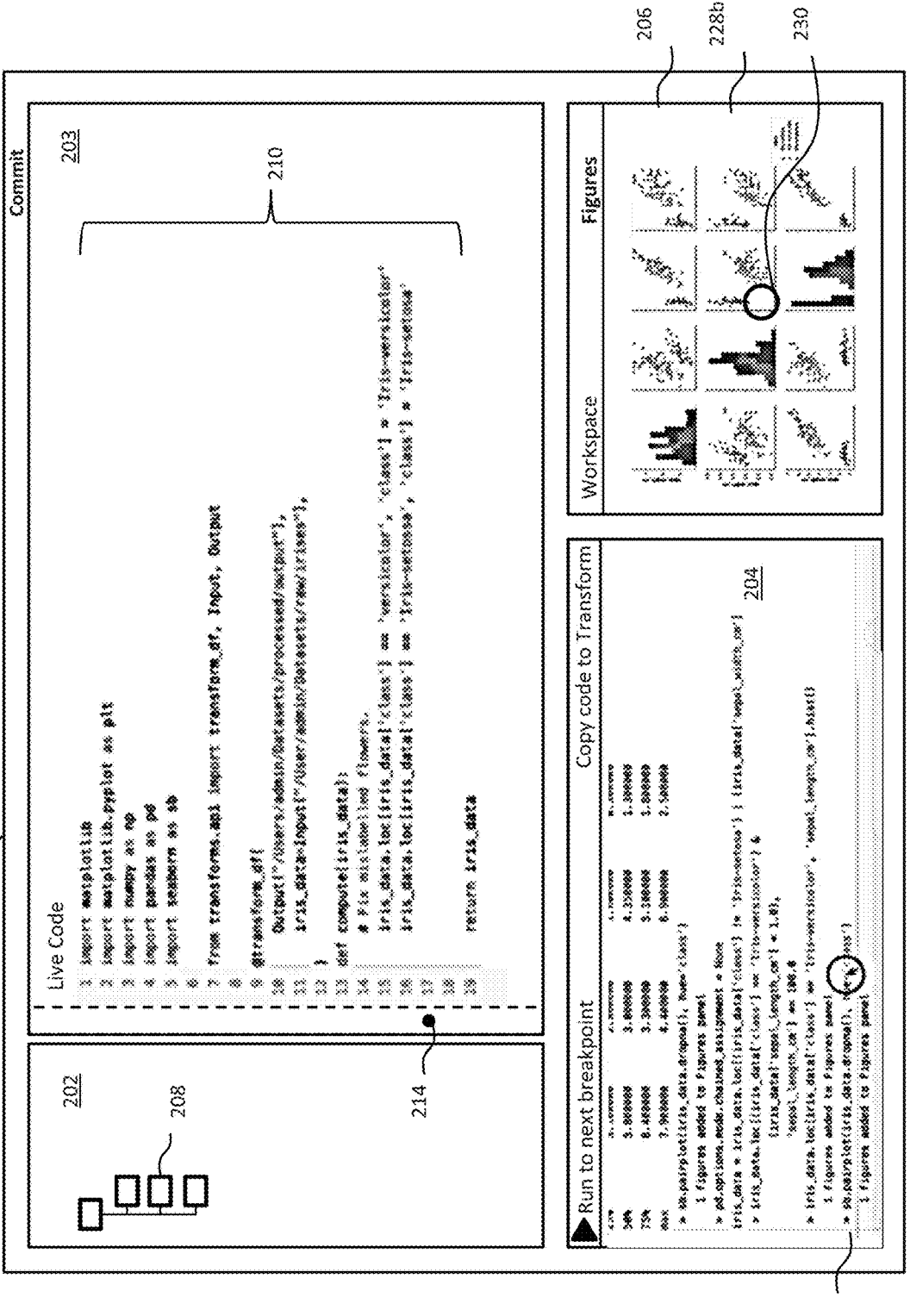
FIG. 7 is another example screenshot of the code modifying tool graphical user interface, according to embodiments.

Referring now to FIG. 7, the result of executing the test code 240 entered in the console window 204 is shown in the analysis window 206. As will be seen, the result is an updated set of graphs 228b in which the erroneous data 230 has been removed. The analysis window 206 may determine automatically and/or indicate that remedial action has been successful.

Figure 8:
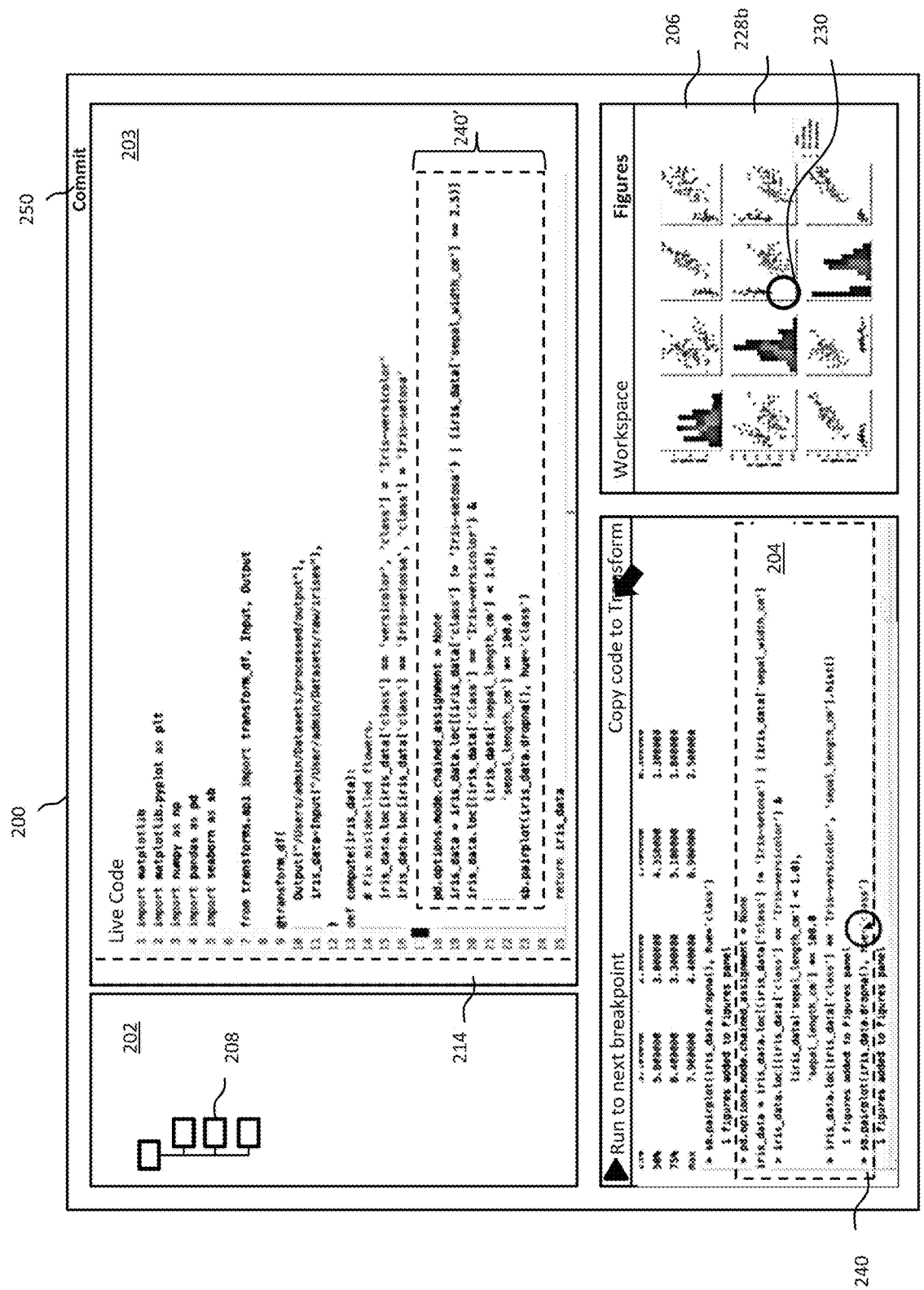
FIG. 8 is another example screenshot of the code modifying tool graphical user interface, according to embodiments.

Referring now to FIG. 8, user selection of the "copy code to transform" button 222 is effective to copy the test code 240 currently in the console window 204 into the executable code 210, i.e. the data transformer, as indicated by its placement in the live code window 203 as element 240'. Advantageously, this means that all test code (whether or not it is visible, as some test code may be out of view due to limitations of the GUI 200 and/or display size) is copied over, through a one-touch or one-click action. Further, also advantageously, the test code 240 is copied over and placed in the executable code 210 after the position of the code sub-portion, e.g. after the breakpoint 214. This is so that the test code 240 will perform its remedial action correctly on code previously produced generated up to the breakpoint 214. This placement occurs regardless of whether the breakpoint 214 is visible, and hence also avoids incorrect placement of the code into a visible portion of the code which may appear the same or similar.

In the above embodiment, the "copy code to transform" button 222 or similar action copies all test code in a single batch. In other embodiments, individual sets of test code may be selected and copied after the breakpoint 214. For example, individual lines, for example corresponding to one or more commands, in the test code can be selected or highlighted and copied in any conventional way, e.g. copy and paste, or through the "copy code to transform" button 222 or through a different button. This enables, through code inspection, which lines in the console window 204 to insert into the executable code 210. In another example embodiment, through code inspection, selection of a "target" command for insertion into the executable code may automatically insert other commands which are dependencies of the target command. For example, if command #10 is selected, and commands #3, #4 and #7 led up to command #10, then commands #3, #4 and #7 may also be inserted into the executable code 210 in the appropriate order.

In some embodiments, no updating of code in the live code window 203 may be performed other than by the "copy code to transform" button 222. For example, the live code window 203 may only be for viewing data and inhibited from receiving manual entry of code through a keyboard or through cut/copy and paste operations.

A commit button 250 is provided as part of the GUI 200. Selection of the commit button 250, or a related operation, is effective to save the updated executable code 210 to the appropriate file location, e.g. referenced by reference numeral 208. This means that the executable code 210, when next run by a third party having ownership of said executable code, will comprise the updated and remedied version of the code.

In some embodiments, metadata or other output data may be generated, associated with running the test code. For example, the output data may be tabular or graphical results produced in the analysis window 206, or the output data may be metadata. It follows then that by inserting the corresponding test code back into the executable code 210 as described, metadata may be associated with the executable code 210 of the data transformer which can be produced as output of data transformer. For example, one might be able to right-click on the file 208 corresponding to a particular data transformer and select "properties" which may display, based on metadata, an indication of the output data produced by that data transformer. For example, if one where to open a file corresponding to a data transformer in the live code window 203, its associated metadata may be converted into the output data which is shown in the analysis window. In other words, there may be an integration between what results in the analysis window 206 during testing and the executable code 210 if the test code is inserted. In some embodiments, the generated metadata may link or otherwise point to the displayable format of the results and may also link or point to comments or explanatory notes as to why the remedial code was needed. The generated metadata may then be linked to the updated executable code 210, e.g. by adding a link in the code, possibly placed as a comment, or in some other accessible way, such as to allow a user subsequently to access via the metadata the results and/or comments/notes in order to ascertain, for example, why a particular change was made and its effect. The metadata may be generated and linked to the executable code 210 in response to user selection of the commit button 250.

In overview, the operation of the code updating tool 170 is explained with reference to FIG. 9, which is a flow diagram indicating processing operations performed by the code modifying tool when executed on a processor, for example using the system shown in FIG. 2.

A first operation 9.1 may comprise providing code representing data processing elements of an executable data transformer.

A second operation 9.2 may comprise executing a sub-portion of the code up to an inserted breakpoint.

A third operation 9.3 may comprise displaying a result of executing the sub-portion of the code up to the breakpoint in an analysis window.

A fourth operation 9.4 may comprise receiving test code in a console window.

A fifth operation 9.5 may comprise executing the test code to apply one or more transformations to generate an updated result of the executed sub-portion of executable code in the analysis window (or another analysis window.)

A sixth operation 9.6 may comprise inserting the test code to the executable code of the data transformer after the breakpoint.

A seventh, and optional operation 9.7, may comprise committing the updated executable code of the data transformer.

An eighth, and further optional operation 9.8, may comprise storing metadata associated with the result of the executed sub-portion with the committed code.

It will be appreciated that certain operations may be omitted or reordered in some embodiments.

The code updating tool 170 or any portion of the tool may be made shareable via a standardized file storage system, for example a cloud service such as Google® Drive.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The invention claimed is:

1. A method, performed by one or more processors, the method comprising:
   providing code representing a plurality of data processing elements of an executable data transformer, one or more of the data processing elements being configured to receive one or more datasets and to produce one or more transformed datasets;
   executing a sub-portion of the code up to an inserted breakpoint and displaying a first result of the executed code sub-portion up to the breakpoint on one or more datasets in a first portion of a user interface;
   receiving test code in a second portion of the user interface and executing the test code to apply a transformation on the one or more data sets transformed by the code sub-portion up to the breakpoint to generate an updated result of a test transformation in the first portion, wherein the test code is executed in isolation with respect to the first result;
   inserting the test code received in the second portion to the code of the data transformer, responsive to user selection, the test code being inserted after the sub-portion of the code;
   displaying in a third portion of the user interface the provided code representing the plurality of data processing elements of an executable data transformer, and receiving insertion of the breakpoint by placement of a breakpoint graphic adjacent a line of said code; and
   displaying a notification in the event that the breakpoint is moved without insertion of the test code;
   wherein the third portion of the user interface is configure to prevent user modification of said provided code other than by insertion of the test code, and
   wherein the test code comprises one or more commands, wherein inserting the test code to the code of the data transformer further includes inserting each of the one or more commands of the test code.

2. The method of claim 1, wherein the test code is inserted responsive to user selection by a single click or tapping action.

3. The method of claim 1, wherein the single click or tapping action is received in relation to a dedicated insertion button or icon on the user interface.

4. The method of claim 1, wherein the test code that is inserted responsive to user selection comprises all test code in the second portion of the user interface.

5. The method of claim 1, wherein the generated, updated result of the test transformation comprises one or more of error messages, tabular data, graphical data, or statistical output.

6. The method of claim 5, wherein automatically detecting erroneous data comprises identifying one or more outliers in statistical output.

7. The method of claim 5, further comprising highlighting the automatically detected erroneous data in the first portion of the user interface.

8. The method of claim 1, further comprising automatically detecting, from one or more of the displayed result, or updated result, erroneous data.

9. The method of claim 1, further comprising saving the updated result and associating metadata to the code of a data processing pipeline upon inserting the test code, which metadata references the saved updated result such that subsequent selection of the data processing pipeline or the metadata causes the saved result associated with the metadata to be displayed.

10. A computer program, stored on a non-transitory computer readable medium, the computer program which, when executed by one or more processors of a data processing apparatus, causes the data processing apparatus to:
   provide code representing a plurality of data processing elements of an executable data transformer, one or more of the data processing elements being configured to receive one or more datasets and to produce one or more transformed datasets;
   execute a sub-portion of the code up to an inserted breakpoint and display a first result of the executed code sub-portion up to the breakpoint on one or more datasets in a first portion of a user interface;
   receive test code in a second portion of the user interface and executing the test code to apply a transformation on the one or more data sets transformed by the code sub-portion up to the breakpoint to generate an updated result of a test transformation in the first portion, wherein the test code is executed in isolation with respect to the first result;
   insert the test code received in the second portion to the code of the data transformer, responsive to user selection, the test code being inserted after the sub-portion of the code;
   display in a third portion of the user interface the provided code representing the plurality of data processing elements of an executable data transformer, and receiving insertion of the breakpoint by placement of a breakpoint graphic adjacent a line of said code; and
   displaying a notification in the event that the breakpoint is moved without insertion of the test code;

wherein the third portion of the user interface is configure to prevent user modification of said provided code other than by insertion of the test code, and wherein the test code comprises one or more commands, wherein inserting the test code to the code of the data transformer further includes inserting each of the one or more commands of the test code.

11. Apparatus comprising one or more processors or special-purpose computing hardware operable to:

provide code representing a plurality of data processing elements of an executable data transformer, one or more of the data processing elements being configured to receive one or more datasets and to produce one or more transformed datasets;

execute a sub-portion of the code up to an inserted breakpoint and display a first result of the executed code sub-portion up to the breakpoint on one or more datasets in a first portion of a user interface;

receive test code in a second portion of the user interface and execute the test code to apply a transformation on the one or more data sets transformed by the code sub-portion up to the breakpoint to generate an updated result of a test transformation in the first portion, wherein the test code is executed in isolation with respect to the first result;

insert the test code received in the second portion to the code of the data transformer, responsive to user selection, the test code being inserted after the sub-portion of the code;

display in a third portion of the user interface the provided code representing the plurality of data processing elements of an executable data transformer, and receiving insertion of the breakpoint by placement of a breakpoint graphic adjacent a line of said code; and displaying a notification in the event that the breakpoint is moved without insertion of the test code;

wherein the third portion of the user interface is configure to prevent user modification of said provided code other than by insertion of the test code, and wherein the test code comprises one or more commands, wherein inserting the test code to the code of the data transformer further includes inserting each of the one or more commands of the test code.

12. The method of claim 1, wherein the first result and the updated result are simultaneously displayed in the first and second portions of the user interface, respectively.

* * * * *